(12) United States Patent
Paul

(10) Patent No.: US 9,145,196 B2
(45) Date of Patent: Sep. 29, 2015

(54) AIRCRAFT FUSELAGE WITH DOOR STOPPERS ATTACHED TO A DOOR FRAME BULKHEAD

(71) Applicant: Airbus Operations GmbH, Hamburg (DE)

(72) Inventor: Carsten Paul, Garstedt (DE)

(73) Assignee: Airbus Operations GmbH (DE)

( * ) Notice: Subject to any disclaimer, the term of this patent is extended or adjusted under 35 U.S.C. 154(b) by 21 days.

(21) Appl. No.: 13/625,130

(22) Filed: Sep. 24, 2012

(65) Prior Publication Data

US 2013/0075528 A1 Mar. 28, 2013

Related U.S. Application Data

(60) Provisional application No. 61/540,054, filed on Sep. 28, 2011.

(30) Foreign Application Priority Data

Sep. 28, 2011 (DE) .......................... 10 2011 114 457

(51) Int. Cl.
B64C 1/14 (2006.01)
(52) U.S. Cl.
CPC .................................... *B64C 1/1407* (2013.01)
(58) Field of Classification Search
USPC ......... 244/119, 121, 129.4, 129.5, 118.3, 131
See application file for complete search history.

(56) References Cited

U.S. PATENT DOCUMENTS

| 3,791,073 | A | * | 2/1974 | Baker | 49/249 |
| 4,086,726 | A | * | 5/1978 | Moses | 49/37 |
| 4,125,235 | A | * | 11/1978 | Fitzgerald et al. | 244/129.5 |
| 5,636,814 | A | * | 6/1997 | Rollert | 244/129.5 |
| 6,126,114 | A | * | 10/2000 | Victor | 244/129.5 |
| 6,168,114 | B1 | * | 1/2001 | Erben | 244/129.5 |
| 6,457,674 | B2 | * | 10/2002 | Erben et al. | 244/129.5 |
| 6,834,834 | B2 | | 12/2004 | Dazet et al. | |

FOREIGN PATENT DOCUMENTS

| DE | 10 2004 009 020 A1 | 9/2005 |
| DE | 10 2007 021 076 B4 | 8/2012 |
| EP | 1227034 A1 | 7/2002 |

* cited by examiner

*Primary Examiner* — Brian M O'Hara
*Assistant Examiner* — Keith L Dixon
(74) *Attorney, Agent, or Firm* — Lerner, David, Littenberg, Krumholz & Mentlik, LLP

(57) ABSTRACT

An aircraft fuselage includes at least one opening that can be closed by a flap or door, which comes to abut against at least one door stopper that is arranged on a fuselage-side door frame bulkhead and transfers the impact forces into an intermediate costal for diversion into an aircraft structure that encompasses bulkheads, wherein the door frame bulkhead exhibits an opening, through which an impact section of the door stopper extends, wherein a fastening plate section adjoining the latter comes to abut the rear side of the door frame bulkhead, which interacts with means for directly introducing the impact forces from the door stopper into the intermediate costal.

10 Claims, 3 Drawing Sheets

AIRCRAFT FUSELAGE WITH DOOR STOPPERS ATTACHED TO A DOOR FRAME BULKHEAD

CROSS-REFERENCE TO RELATED APPLICATIONS

The present application claims the benefit of the filing date of U.S. Provisional Patent Application No. 61/540,054 filed Sep. 28, 2011, the disclosure of which is hereby incorporated herein by reference.

AREA OF THE INVENTION

The invention relates to an aircraft fuselage with at least one opening that can be closed by a flap or door, which comes to abut against at least one door stopper that is situated on a fuselage-side door frame bulkhead and transfers the impact forces into an intermediate costal for diversion into an aircraft structure that encompasses bulkheads.

The area of application of the invention extends to aircraft construction. Usually comprised of bulkheads and stringers, the aircraft structure of commercial aircraft with large-volume fuselages is provided with an outer skin that accommodates openings for flaps that allow access into the cargo hold, service flaps and especially doors that allow access into the cabin.

BACKGROUND OF THE INVENTION

EP 1 227 034 B1 describes an aircraft door and articulated device for moving the latter relative to an opening in the aircraft fuselage. The door encompasses a door frame bulkhead that is fixedly connected with the aircraft fuselage, and borders an essentially rectangular opening in the interior. When the door is closed, this opening is covered by a door leaf of the door. So that it can move, the door is joined with a column of the door frame bulkhead by way of an articulated device. The function of the articulated device is predominantly to establish the outward path taken by the door relative to the opening. Another function of the articulated device is to keep the alignment of the door constant as it moves along the aforementioned path. The door is further provided with locking means, which are used to lock and unlock the door relative to the door frame bulkhead when the door is in the closed position. In addition, the door frame bulkhead is provided with stops, which are arranged along the essentially vertical column of the door frame bulkhead of the door. When the door is closed, stops on the door side come into contact with stops on the door frame bulkhead side, and determine the closed position of the door relative to the aircraft fuselage.

FIG. 1 shows a door stopper 1 generally known in prior art that serves as a stop, which is screwed to a door frame bulkhead 3 by means of several screw connection means 2, which are here schematically depicted. The screw connection means 2 also establish a connection to a so-called intermediate costal 4. The impact forces on the door stopper 1 are diverted into the aircraft structure from an intermediate costal 4. The door 6 generating the impact forces on the door stopper 1 is here only depicted schematically.

Evident from DE 10 2004 009 020 A1 is a typical intermediate costal, which is also referred to as an intercostal. The intermediate costal is inserted in the region of the opening of an aircraft fuselage in order to transfer moments and forces, such as the impact forces acting on the door stoppers, to an adjacent bulkhead or the aircraft skin. The intermediate costal for diverting forces and moments from a first bulkhead, for example to include a door frame bulkhead, to a second bulkhead or the outer skin of the aircraft consists of a framework structure with an inner belt, an outer belt, and several rods running in between, which yield a triangular shape corresponding to a framework structure. The outer belt is adjusted for an abutting assembly along the outer skin of the aircraft fuselage, so as to enable a support for the outer skin. Various connecting brackets and connecting bolts are used to secure the intermediate costal to adjacent bulkheads and the like.

BRIEF SUMMARY OF THE INVENTION

An aspect of the present invention further improves a vehicle fuselage with door stoppers arranged on a door frame bulkhead in such a way that the impact forces acting on the door stopper can be reliably diverted into the aircraft structure using fewer structural components.

An aspect of the invention encompasses the technical instruction that the door frame bulkhead exhibits an opening through which an impact section of a door stopper extends, wherein a rear-adjoining fastening plate section comes to abut against the back of the door frame bulkhead, which interacts with means for directly introducing the impact forces from the door stopper into the intermediate costal.

In particular, the advantage to the solution according to an aspect of the invention is that it eliminates the need for a bulkhead like the one depicted on FIG. 1 for diverting the impact forces into the aircraft structure. In addition, assembling the door stopper through the opening of the door frame bulkhead allows a largely concealed attachment of the door stopper to the door frame bulkhead, since only the impact section projects out of the opening as viewed from outside. The solution according to an aspect of the invention makes it possible to introduce the impact forces of the door acting on the door stopper directly into the intermediate costal, which diverts the forces into the aircraft structure.

According to an embodiment of the invention, the means for introducing impact forces from the door stopper into the intermediate costal can exhibit various designs:

In a preferred embodiment, the means for directly introducing the impact forces from the door stopper into the intermediate costal are designed as a connecting sheet that extends from the fastening plate section to the adjoining cell of the intermediate costal. The connecting sheet can here be secured to the fastening plate section of the door stopper and to the intermediate costal by means of several rivets or screws. In particular, this embodiment can be used in all door environments consisting of aluminum. The door stopper preferably consists of a titanium material, and the intermediate costal and connecting sheet of an aluminum material. A door stopper made out of titanium material combines a low component weight with high strength. For example, the door stopper can here be milled or sawn out of a titanium plate, milled out of a titanium forging, or fabricated as a titanium git that is not subsequently machined.

As an alternative hereto, the fastening plate section of the door stopper can be designed as an integral constituent of the intermediate costal as a means for directly introducing the impact forces from the door stopper into the intermediate costal. In this case, the intermediate costal consists of a titanium material to ensure a sufficient overall strength. This embodiment can preferably be used in all door environments consisting of aluminum or a fiber-reinforced plastic, in particular a carbon fiber-reinforced plastic (CFP).

Another preferred embodiment proposes that the means for directly introducing the impact forces from the door stopper into the intermediate costal be designed as a nonmetallic connecting plate extending from the fastening plate section to the adjoining cell of the intermediate costal. In this case, the door stopper preferably consists of a titanium material, and the intermediate costal and connecting plate of a fiber-reinforced plastic material. This embodiment is preferably suited for door environments consisting of fiber-reinforced plastic. The intercostals consisting of the same material can be easily integrated into the remaining aircraft structure.

Another measure of the invention proposes that the impact section of the door stopper exhibit a cross-shaped cross section in the connection area to the fastening plate section adjoining the latter. This cross section increases the strength of the component while saving on material. In this case, the opening in the door frame bulkhead envelops the cross-shaped cross section of the door stopper, and can be given a corresponding polygonal or oval design.

BRIEF DESCRIPTION OF THE DRAWINGS

Other measures of the invention will be explained in greater detail below in conjunction with the description of preferred exemplary embodiments of the invention based on the figures. Shown on.

DETAILED DESCRIPTION

Figure 1:
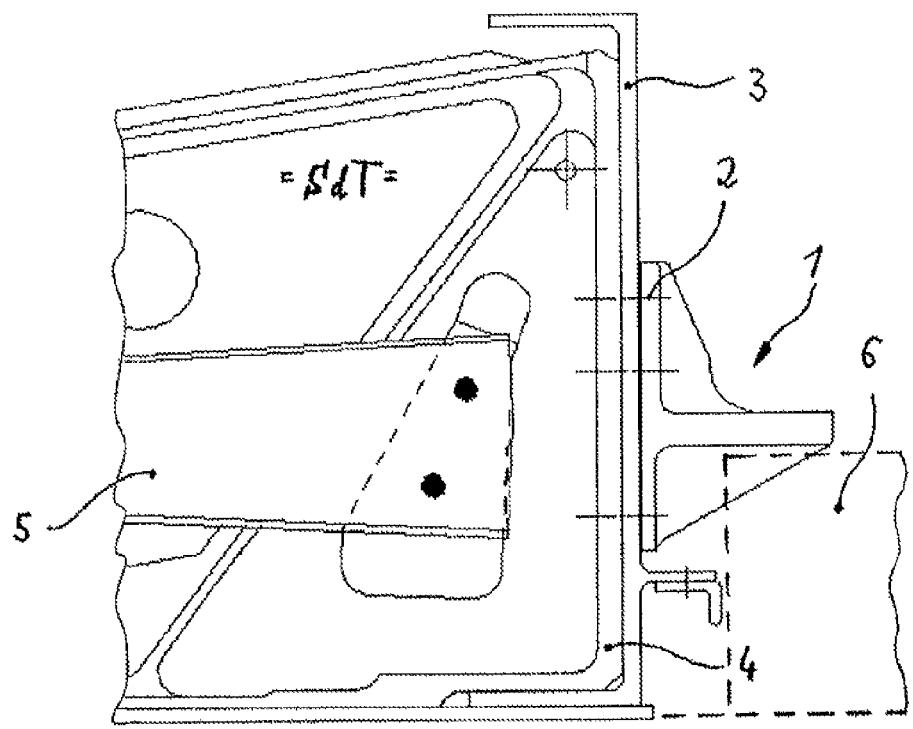
FIG. 1 is a detailed cross section in the area of the door frame bulkhead with a door stopper secured thereto according to prior art.
Figure 2:
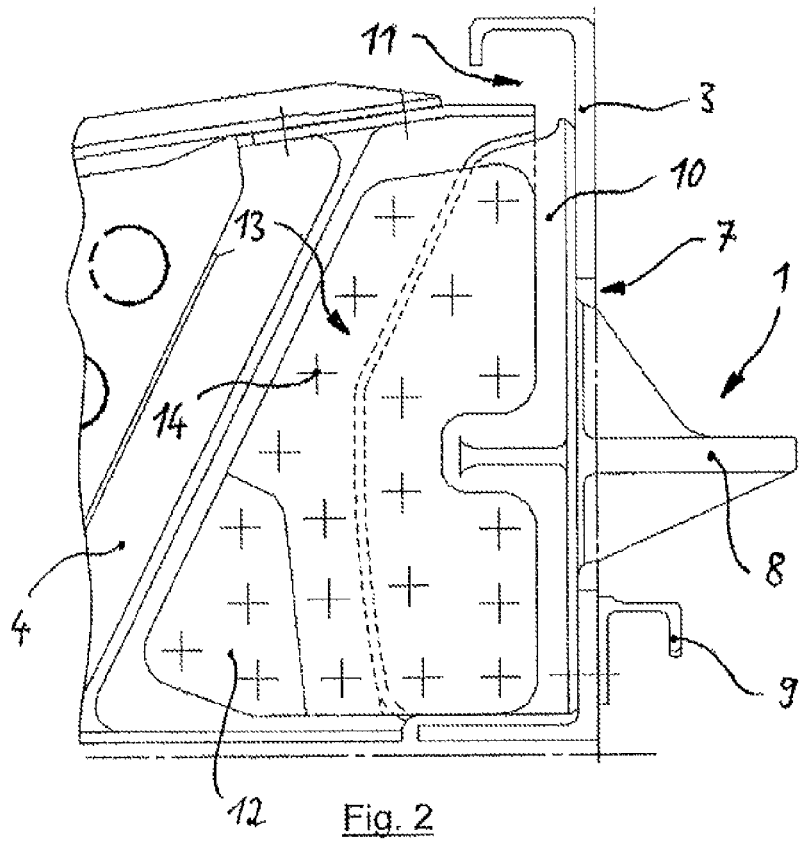
FIG. 2 is a detailed cross section in the area of the door frame bulkhead with a door stopper secured thereto according to an embodiment of the invention.

According to FIG. 2, the door frame bulkhead 3 exhibits an opening 7, through which an impact section 8 of the door stopper 1 extends. A sealing profile 9 used for the door (not shown here in any greater detail) is here secured to the door frame bulkhead 3 on the outside of the aircraft, adjacent to the door stopper 1.

A fastening plate section 10 that adjoins the impact section 8 of the door stopper 1 from the back comes to abut against the rear side 11 of the door frame bulkhead 3. The impact forces on the door stopper 1 are directly introduced into the intermediate costal 4 by securing a connecting sheet 12 that extends toward the adjoining cell of the intermediate costal 4 to the fastening plate section 10 of the door stopper 1. The connecting sheet 12 is secured by (for example) rivets 14 to the fastening plate section 10 of the door stopper 1 on the one hand, and to the intermediate costal 4 on the other.

Figure 3:
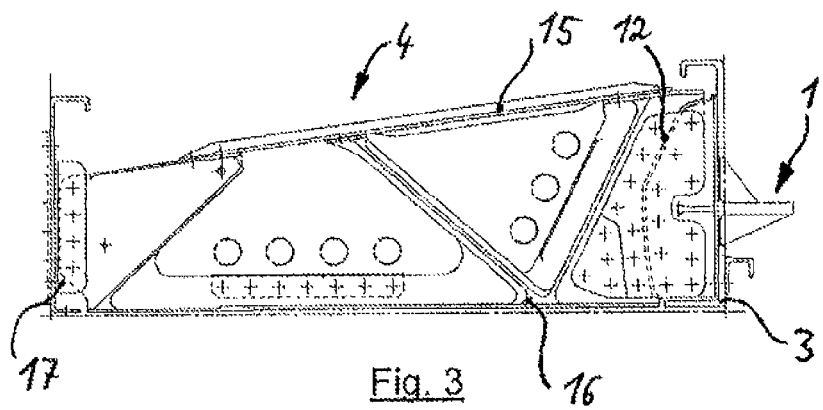
FIG. 3 is a side view of an intermediate costal connected with the door stopper in a first embodiment.

According to FIG. 3, the intermediate costal 4 consists of a frame structure, and exhibits an outer belt 15, an inner belt 16, and several braces 17 (for example) running in between. The intermediate costal 4 runs in the longitudinal direction between the door frame bulkhead 3 equipped with the door stopper 1 and an opposing door frame secondary bulkhead 17. The attachment is established using various bracket elements and fastening means.

In this embodiment, the door stopper 1 consists of a titanium material, while the intermediate costal 4 and connecting sheet 12 are fabricated out of an aluminum material.

Figure 4:
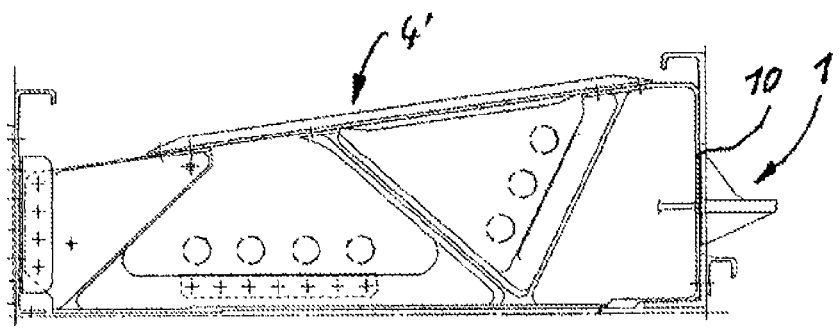
FIG. 4 is a side view of an intermediate costal connected with the door stopper in a second embodiment.

In the embodiment shown on FIG. 4, the fastening plate section 10 of the door stopper 1 is an integral constituent of the intermediate costal 4'. The intermediate costal 4' with door stopper 1 consists of a titanium material.

Figure 5:
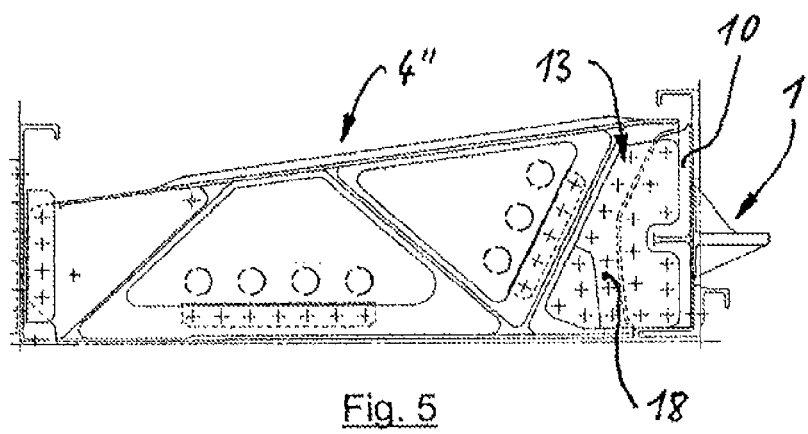
FIG. 5 is a side view of an intermediate costal connected with the door stopper in a third embodiment.

In the additional embodiment shown on FIG. 5, the means for directly introducing the impact forces from the door stopper 1 into the intermediate costal 4" are designed as a connecting plate 18 extending from the fastening plate section 10 to the adjoining cell 13 of the intermediate costal 4". In this case, the door stopper 1 consists of a titanium material, and the intermediate costal 4" and connecting plate 18 are fabricated out of a fiber-reinforced carbon material, CFK in this instance.

Figure 6:
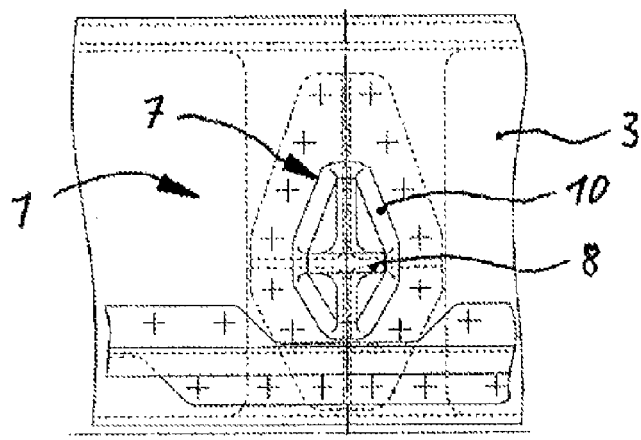
FIG. 6 is a top view of the door frame bulkhead with built-in door stopper.

According to FIG. 6, the stop section 8 of the door stopper 1 exhibits a cross-shaped cross section in the connection area to the fastening plate section 10 adjoining the latter. The opening 7 in the door frame bulkhead 3 envelops the cross-shaped cross section of the door stopper 1 so as to follow the contour.

Figure 7:
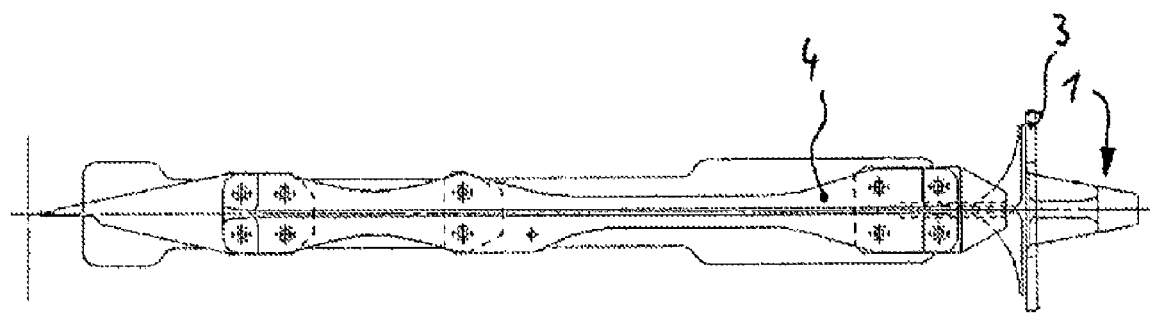
FIG. 7 is a top view of an intermediate costal with door stopper secured thereto.

According to FIG. 7, the door stopper 1 placed to the back of the door frame bulkhead 3 is directly connected to the intercostal 4, so as to directly introduce the impact forces acting on the door stopper into the aircraft structure (not shown in any greater detail) via the intermediate costal 4.

In addition, let it be noted that "encompassing" does not preclude any other elements or steps, and "an" or "a" do not rule out a plurality. Let it further be noted that features or steps described with reference to one of the above exemplary embodiments can also be used in combination with other features or steps from other exemplary embodiments described above. Reference numbers in the claims are not to be construed as a limitation.

REFERENCE LIST

1 Door stopper
2 Connection element
3 Door frame bulkhead
4 Intermediate costal (intercostal)
5
6 Door
7 Opening
8 Impact section
9 Sealing profile
10 Fastening plate section
11 Rear side
12 Connecting sheet
13 Cell
14 Fastening means
15 Outer belt
16 Inner belt
17 Door frame secondary bulkhead
18 Connecting plate

The invention claimed is:
1. An aircraft fuselage comprising:
at least one opening configured to be closed by a flap or a door,
wherein the flap or the door is configured to abut against at least one door stopper arranged on a fuselage-side door frame bulkhead and to transfer impact forces into an intermediate costal for diversion into an aircraft structure encompassing bulkheads, wherein the door frame bulkhead comprises an opening, through which an impact section of the door stopper extends, wherein a fastening plate section adjoining the door stopper abuts a rear side of the door frame bulkhead interacting with means for directly introducing the impact forces from the door stopper into the intermediate costal.

2. The aircraft fuselage of claim 1, wherein the means for directly introducing the impact forces from the door stopper into the intermediate costal comprising a connecting sheet extending from the fastening plate section to an adjoining cell of the intermediate costal.

3. The aircraft fuselage of claim 2, wherein the connecting sheet is secured to the fastening plate section of the door stopper and to the intermediate costal by a plurality of rivets or screws.

4. The aircraft fuselage of claim 2, wherein the door stopper comprises a titanium material, and the intermediate costal and connecting sheet comprise an aluminum material.

5. The aircraft fuselage of claim 1, wherein the fastening plate section of the door stopper is comprises an integral constituent of the intermediate costal for directly introducing the impact forces from the door stopper into the intermediate costal.

6. The aircraft fuselage of claim 5, wherein the intermediate costal with door stopper comprises a titanium material.

7. The aircraft fuselage of claim 1, wherein the means for directly introducing the impact forces from the door stopper into the intermediate costal comprises a nonmetallic connecting plate extending from the fastening plate section to an adjoining cell of the intermediate costal.

8. The aircraft fuselage of claim 7, wherein the door stopper comprises a titanium material, and the intermediate costal and the connecting plate comprise a fiber-reinforced plastic material.

9. The aircraft fuselage according to claim 1, wherein the impact section of the door stopper comprises a cross-shaped cross section in the connection area to the fastening plate section adjoining the latter.

10. The aircraft fuselage of claim 9, wherein the opening in the door frame bulkhead envelops the cross-shaped cross section of the door stopper.

* * * * *